US010773242B2

United States Patent
Bernardoni

(10) Patent No.: US 10,773,242 B2
(45) Date of Patent: Sep. 15, 2020

(54) CEMENT-BASED PHOTOCATALYTIC COMPOSITION, AND USE THEREOF FOR OBTAINING WATER PAINTS, IN PARTICULAR FOR OUTDOOR APPLICATIONS

(71) Applicant: AM TECHNOLOGY LIMITED, London (GB)

(72) Inventor: Massimo Bernardoni, Milan (IT)

(73) Assignee: AM TECHNOLOGY LIMITED, London (GB)

( * ) Notice: Subject to any disclaimer, the term of this patent is extended or adjusted under 35 U.S.C. 154(b) by 325 days.

(21) Appl. No.: 15/129,015

(22) PCT Filed: Mar. 25, 2015

(86) PCT No.: PCT/IB2015/052206
§ 371 (c)(1),
(2) Date: Sep. 26, 2016

(87) PCT Pub. No.: WO2015/145375
PCT Pub. Date: Oct. 1, 2015

(65) Prior Publication Data
US 2017/0106350 A1    Apr. 20, 2017

(30) Foreign Application Priority Data

Mar. 26, 2014  (IT) .............................. MI2014A0514

(51) Int. Cl.
*B01J 21/06* (2006.01)
*C04B 28/04* (2006.01)
*C04B 28/02* (2006.01)
*B01J 35/00* (2006.01)
*B01J 35/02* (2006.01)
*B01J 37/02* (2006.01)
*C04B 14/28* (2006.01)
*C04B 111/00* (2006.01)
*C04B 111/20* (2006.01)
*C04B 103/30* (2006.01)

(52) U.S. Cl.
CPC ........... *B01J 21/063* (2013.01); *B01J 35/004* (2013.01); *B01J 35/0013* (2013.01); *B01J 35/023* (2013.01); *B01J 37/0215* (2013.01); *C04B 14/28* (2013.01); *C04B 28/02* (2013.01); *C04B 28/04* (2013.01); *C04B 2103/30* (2013.01); *C04B 2111/00508* (2013.01); *C04B 2111/00827* (2013.01); *C04B 2111/2061* (2013.01)

(58) Field of Classification Search
None
See application file for complete search history.

(56) References Cited

U.S. PATENT DOCUMENTS

| | | | |
|---|---|---|---|
| 5,928,956 A * | 7/1999 | Rotzsche | G01N 30/12 436/155 |
| 6,406,536 B1 | 6/2002 | Cassar et al. | |
| 9,346,712 B2 * | 5/2016 | Baumann | C04B 28/02 |
| 2010/0126845 A1 * | 5/2010 | Alfani | C04B 28/02 204/157.3 |
| 2013/0310488 A1 * | 11/2013 | Zeh | C04B 20/002 524/5 |

FOREIGN PATENT DOCUMENTS

| | | | | |
|---|---|---|---|---|
| EP | 1 524 249 A1 | 4/2005 | | |
| KR | 1020070092193 A | 9/2007 | | |
| WO | 2004-074202 A1 | 9/2004 | | |
| WO | 2009/013337 A2 | 1/2009 | | |
| WO | WO-2012127066 A1 * | 9/2012 | ............. | C04B 28/06 |
| WO | 2013/018059 A2 | 2/2013 | | |
| WO | WO 2013/018059 * | 2/2013 | | |
| WO | WO-2013018059 A2 * | 2/2013 | ............. | C04B 28/04 |
| WO | WO-2013037792 A1 * | 3/2013 | ............. | B28B 7/364 |

OTHER PUBLICATIONS

Brumaud, Cellulose ethers and water retention, Cement and Concrete Research, vol. 53, Nov. 2013, p. 176-184 (Year: 2013).*
Chung et al, review improving cement based materials using fumed silica, journal of materials science, 37, pp. 673-682 (Year: 2002).*
International Search Report, dated Jul. 30, 2015, issued in international Application No. PCT/IB2015/052206.

* cited by examiner

*Primary Examiner* — Stefanie J Cohen
(74) *Attorney, Agent, or Firm* — Saul Ewing Arnstein & Lehr LLP

(57) ABSTRACT

Cement-based photocatalytic composition, which comprises: (a) at least one cement binder; (b) at least one photocatalyst; (c) at least one cellulose ether; (d) at least one fluidizing agent; (e) at least one first calcareous filler in the form of particles of which at least 95% by weight has a size not greater than 100 μm; (f) at least one second calcareous filler in the form of particles of which at least 95% by weight has a size not greater than 30 μm; (g) at least one silane supported on an inorganic support in the form of powder. Such composition can be employed as a water paint for obtaining wall coatings with very low thickness, in particular the outdoor applications, which ensure a high and stable photocatalytic effect over time even with relatively low quantities of photocatalyst, generally lower than 10% by weight, with optimal results in terms of uniformity of the coating and resistance of the same to weathering agents.

24 Claims, No Drawings

CEMENT-BASED PHOTOCATALYTIC COMPOSITION, AND USE THEREOF FOR OBTAINING WATER PAINTS, IN PARTICULAR FOR OUTDOOR APPLICATIONS

CROSS REFERENCE TO RELATED APPLICATIONS

This application claims the priority of PCT/IB2015/052206, filed on Mar. 25, 2015, which claims the benefit of priority to Italian Application No. MI2014A000514, filed on Mar. 26, 2014, the entire contents of each of which are fully incorporated herein by reference.

BACKGROUND OF THE INVENTION

The present invention regards a cement-based photocatalytic composition, and the use thereof for obtaining water paints, in particular for outdoor applications.

Photocatalysis is a natural phenomenon that regards some substances, known as photocatalysts, which—when irradiated with light of suitable wavelength—are capable of catalyzing some chemical reactions. In particular, in the presence of air and light, oxidative processes are activated on a surface containing a photocatalytic substance that lead to the transformation and/or decomposition of organic and inorganic polluting substances (microbes, nitrogen oxides, polycondensate aromatic products, benzene, sulfur dioxide, carbon monoxide, formaldehyde, acetaldehyde, methanol, ethanol, benzene, ethylbenzene, methylbenzene, nitrogen monoxide and dioxide). Such polluting and/or toxic substances are transformed, through the photocatalysis process, into innocuous substances that can be washed away by rain water or via washing, such as sodium nitrate ($NaNO_3$), calcium sulfate ($CaSO_4$), calcium nitrate ($Ca(NO_3)_2$) and calcium carbonate ($CaCO_3$).

Photocatalytic processes can then be used for considerably reducing the pollutants present in the environment, such as those produced by the exhaust gases of automobiles, factories, home heating and other sources, and at the same time eliminate dirt, mold, and bacteria that degrade the external surfaces of buildings or other structures.

The photocatalysts are generally metal compounds such as titanium dioxide, $TiO_2$, the most active and most used, zinc oxide, $ZnO$, and other oxides and sulfides ($CeO_2$, $ZrO_2$, $SnO_2$, $CdS$, $ZnS$, etc.).

Much effort has been expended to provide compositions containing a photocatalyst to be used for coating building surfaces, which can be applied with the means commonly employed in the building industry; such compositions ensure a significant and enduring photocatalytic effect, simultaneously ensuring a satisfactory aesthetic effect, as well as of course at non-excessive costs, so as to allow the application thereof on a large scale.

According to the prior art, the photocatalytic product is usually incorporated in formulations of paints or varnishes with substantially organic base of conventional type. Nevertheless, such formulations, given that they are of organic nature, undergo the action of transformation and/or decomposition catalyzed by the photocatalyst, so that the properties of the applied coating are degraded over time, with detachment and pulverization phenomena, as well as causing a quick decay of the original photocatalytic properties.

Also known in the art are cement-based compositions which comprise a photocatalyst.

For example, in the patent application WO 2009/013337, photocatalytic compositions are described which comprise: a hydraulic binder; a polycarboxylic or acrylic superfluidizing agent; a cellulose ether with viscosity comprised between 10,000 and 120,000 mPa·s; an adhesive agent; a calcareous, silicic or silicocalcareous filler; a photocatalyst. Such compositions would be provided with rheological properties such to render them particularly suitable for the application on large surfaces, without dripping or deformations.

In the patent application WO 2013/018059, a photocatalytic powder paint is described for use diluted in water, which comprises: Portland cement combined with photocatalytic titanium dioxide in nanoparticle form; a calcareous inert substance with maximum particle size lower than 100 μm; cellulose with viscosity lower than 1000 mPa·s; a fluidizing agent; an anti-foaming agent; a vinyl polymer; pigments. Such composition also comprises at least one of the following additives: metakaolin, calcium formate and diatomaceous earth.

SUMMARY OF THE INVENTION

The Applicant has faced the technical problem of providing a cement-based photocatalytic composition, usable for obtaining water paints, namely wall coatings with very low thickness, in particular for outdoor applications, which is capable of:

(a) ensuring a high photocatalytic effect that is stable over time, also with relative low quantities of photocatalyst, generally lower than 10% by weight;

(b) allowing the preparation and application of the water paint with conventional means, such as those used for common painting works, with optimal results in terms of uniformity of the coating and resistance of the same to weathering agents;

(c) using products devoid of toxic or dangerous effects, without using heavy metals and organic solvents, in particular aromatic solvents, so as to obtain a product with a content of volatile organic compounds (VOC) lower than 0.35 g/l.

These and further objects that will be better illustrated hereinbelow have been achieved by the Applicant by means of a cement-based photocatalytic composition as defined in the following description and enclosed claims, which allows obtaining, in addition to the above-described results, also an improved reflectance of the visible radiation, due in particular to the use of a combination of calcareous fillers having different particle size. In addition, the addition of a silane in powder form as better described hereinbelow ensures greater hydrophobicity to the water paint, and hence improved resistance to the action of weathering agents.

DETAILED DESCRIPTION OF THE INVENTION

In a first aspect, the present invention therefore regards a cement-based photocatalytic composition, which comprises:

(a) at least one cement binder;
(b) at least one photocatalyst;
(c) at least one cellulose ether;
(d) at least one fluidizing agent;
(e) at least one first calcareous filler in the form of particles of which at least 95% by weight has a size not greater than 100 μm;
(f) at least one second calcareous filler in the form of particles of which at least 95% by weight has a size not greater than 30 μm;

(g) at least one silane supported on an inorganic support in the form of powder.

Preferably, the photocatalytic composition comprises:

(a) from 15 to 60% by weight, more preferably from 20 to 50% by weight, of at least one cement binder;

(b) from 0.5 to 12% by weight, more preferably from 1 to 8% by weight, of at least one photocatalyst;

(c) from 0.02 to 3% by weight, more preferably from 0.05 to 1.5% by weight, of at least one cellulose ether;

(d) from 0.05 to 5% by weight, more preferably from 0.1 to 2% by weight, of at least one fluidizing agent;

(e) from 10 to 50% by weight, more preferably from 15 to 35% by weight, of at least one first calcareous filler in the form of particles of which at least 95% by weight has a size not greater than 100 µm;

(f) from 10 to 50% by weight, more preferably from 15 a 35% by weight, of at least one second calcareous filler in the form of particles of which at least 95% by weight has a size not greater than 30 µm;

(g) from 0.05 to 5% by weight, more preferably from 0.01 to 3% by weight, of at least one silane supported on an inorganic support in the form of powder.

In the scope of the present description and of the enclosed claims, the quantities of the various components of the photocatalytic composition are expressed, except where differently indicated, as percentages by weight with respect to the overall weight of the composition itself.

In a second aspect, the present invention regards the use of a cement-based photocatalytic composition as defined above for coating building structures in order to reduce the presence of polluting agents.

In addition, the present invention regards the use of a cement-based photocatalytic composition as defined above for coating surfaces made of metal, wood or plastic material, e.g. polyvinylchloride (PVC). With regard to the cement binder (a), this is generally made of a hydraulic cement material in powder form in dry state, which, when mixed with water, forms a plastic material that is capable of consolidating and hardening after a time sufficient to allow the application thereof in the plastic state. Preferably, the cement binder is Portland cement.

Preferably, the photocatalyst (b) is titanium dioxide in photocatalytic form, i.e. mainly in anatase crystalline form. The photocatalytic titanium dioxide preferably has a particle size such that at least 95% by weight has a size not greater than 50 nm, more preferably not greater than 20 nm. Preferably the photocatalytic titanium dioxide has a surface area comprised between 100 and 500 m²/g. The photocatalytic titanium dioxide can also be used in admixture with non-photocatalytic titanium dioxide, for example in rutile crystalline form, which allows imparting an intense white color to the composition. Preferably, the non-photocatalytic titanium dioxide is present in a quantity from 0.5 to 20% by weight, more preferably from 1 to 15% by weight.

As regards the cellulose ether (c), this preferably has a Brookfield viscosity RVT at 20° C. from 100 to 70,000 mPa·s, more preferably from 100 to 30,000 mPa·s, even more preferably from 200 to 10,000 mPa·s.

The viscosity can be measured, for example, on a 2% solution by weight in water. In particular, the cellulose ether can be selected from: ethylcellulose, hydroxypropylcellulose, methylhydroxypropylcellulose, methylcellulose, carboxymethylcellulose, methylcarboxyethylcellulose, or mixtures thereof. Products of this type can be found on the market, for example with the trademarks Culminal™, Walocel™ and Tylose™.

The fluidizing agent (d) can be selected from the products commonly employed in the cement field. These are usually vinyl or acrylic polymers, such as for example: polyvinylacetate, polyvinylversatate, polybutylacrylate or copolymers thereof (commercial products by Elotex). Preferably, the fluidizing agent is a superfluidizing agent, e.g. polycarboxylate, more specifically a copolymer from an unsaturated mono- or dicarboxylic acid and a polymerizable unsaturated comonomer. Examples of unsaturated mono- or dicarboxylic acids include: acrylic acid, methacrylic acid, crotonic acid, maleic acid, fumaric acid, itaconic acid, citraconic acid, and the like. Examples of polymerizable unsaturated comonomers include: polyalkylene glycol mono(meth)acrylate (e.g.: triethylene glycol monoacrylate and polyethylene glycol monoacrylate, in which the polyethylene glycol has an average molecular weight from 200 to 1000). Products of this type can be found on the market, for example with the trademark Melflux™.

With regard to the calcareous fillers (e) and (f), the first calcareous filler is in the form of particles of which at least 95% by weight has a size not greater than 100 µm, preferably not greater than 70 µm, while the second calcareous filler is in the form of particles of which at least 95% by weight has a size not greater than 30 µm, preferably not greater than 20 µm. Preferably, the first calcareous filler is in the form of particles of which not more than 5% by weight has a size not greater than 30 µm, preferably not greater than 20 µm. The calcareous fillers, defined for example in the UNI EN 12620:2008 standard, are finely subdivided calcareous minerals, mainly containing calcium carbonate (generally the calcium carbonate content is at least equal to 75% by weight). Preferably, the calcareous fillers (e) and (f) are present in a weight ratio (e)/(f) between 0.2 and 2.0, more preferably between 0.5 and 1.5. The Applicant believes that the addition of the second calcareous filler, having finer particle size than the first, allows obtaining a coating of greater quality since the smaller granules fill the interstices present between the particles of the other materials, in particular between the particles of the photocatalyst.

With regard to the silane supported on an inorganic support in the form of powder (g), this is generally an organic silane supported on an inorganic support, such as silica or silicates. Preferably the supported silane is in the form of particles of which at least 95% by weight has a size not greater than 100µ, preferably not greater than 80µ.

Preferably, the silane is an alkyltrialkoxy silane of formula $R_1Si(OR_2)_3$, where $R_1$ is an alkyl $C_1$-$C_{18}$, preferably $C_4$-$C_{12}$, linear or branched, while the groups $R_2$, equal to or different from each other, are alkyls, linear or branched, $C_1$-$C_6$, preferably $C_1$-$C_4$. For example, the silane is i-butyltriethoxysilane, n-octyltriethoxysilane, i-octyltriethoxysilane.

Preferably, the photocatalytic composition in accordance with the present invention further comprises at least one hydrophobized vinyl polymer (h), which allows further increasing the hydrophobic properties of the water paint. Such polymer (h), available in powder form, can be preferably added in a quantity from 1 to 20% by weight, more preferably from 3 to 10% by weight. Preferably, the hydrophobized vinyl polymer is a vinylchloride, ethylene and vinyl ester terpolymer $CH_2=CH-O-C(=O)-R$, where R is an alkyl, linear or branched, $C_4$-$C_{24}$, e.g. vinyl laurate. Products of this type can be found on the market, for example with the trademark Vinnapas™.

Still as hydrophobizing agent, at least one salt of a long chain carboxylic acid (i) can be added to the photocatalytic compositions in accordance with the present invention, for example calcium stearate, and the like. The quantity of said salt is generally comprised between 0.01 and 5% by weight, more preferably between 0.1 and 2% by weight.

The photocatalytic composition in accordance with the present invention can also comprise further additives commonly used in this product type, such as: anti-foaming agents, pigments, aerating additives, metakaolin, calcium formate, diatomaceous earth, etc.

The photocatalytic composition in accordance with the present invention can be produced in accordance with known techniques, via mixing of the various components in dry state in any order, using a suitable mechanical mixer, e.g. a planetary mixer, for a time sufficient for obtaining good homogenization.

In order to prepare the water paint, water is added to the photocatalytic composition in the predetermined proportion, mixing until a homogeneous and fluid product is obtained.

The weight ratio between water and cement binder (a) can vary within wide limits as a function of the specificity of the used components and of the application technique that one wishes to employ. The water/binder weight ratio is generally comprised between 0.2 and 0.8.

The application of the water paint can be made with conventional means, such as those used for common painting works, like brushes and rollers, or even spatulas, trowels, airless pumps, etc. The application can occur on buildings of various type, such as wall structures, both external and internal, tiles, slabs, prefabricated structures, cement buildings such as sound absorbent barriers and new jersey barriers, tunnels, exposed concrete, constituting part of urban buildings or street furniture. After application and drying, the thickness of the photocatalytic composition layer can vary within wide limits as a function of the building and of the photocatalytic effect that one wishes to obtain. Generally, a thickness from 0.05 mm to 1 mm, more preferably from 0.1 to 0.5 mm is sufficient.

The following examples are provided for merely exemplifying purposes of the present invention and must not be intended as limiting the protective scope defined by the enclosed claims.

EXAMPLE 1

A photocatalytic composition was obtained in accordance with the present invention by mixing the following components in the quantities reported in Table 1.

TABLE 1

| Component | Commercial name | Quantity (% by weight) |
| --- | --- | --- |
| Portland cement | — | 40 |
| Photocatalytic titanium dioxide | CristalActiv ™ PC500 | 5 |
| Cellulose ether (methylhydroxypropyl-cellulose) | Culminal ™ MHPC 500 PF | 0.8 |
| Superfluidizing agent | Melflux ™ 2651 F | 0.5 |
| Micronized calcareous filler (≥95% with size ≤60 μm) | Lithos ™ Mineraria Lithocarb GR60 | 20 |
| Calcareous ultrafiller (≥95% with size ≤20 μm) | Imerys ™ #10 white | 20 |
| Silane in powder form | Protectosil ™ 851 | 0.5 |
| Metakaolin | — | 2.2 |

TABLE 1-continued

| Component | Commercial name | Quantity (% by weight) |
| --- | --- | --- |
| Non-photocatalytic titanium dioxide | Tioxide R-XL | 5 |
| Hydrophobized vinyl polymer | Vinnapas ™ 8034 H | 4 |
| Anti-foaming agent | Defomex ™ AP 199 | 1.5 |
| Calcium stearate | — | 0.5 |

A water paint was prepared by mixing the aforesaid composition with water in a 60% weight ratio. The water paint was applied on a sample with an average thickness equal to 0.3 mm, and solar light reflectance and heat emittance characteristics thereof were measured. The results are reported in Table 2.

TABLE 2

| Property | Standard | Measured value |
| --- | --- | --- |
| Solar reflectance index (SRI) | ASTM E1980-11 | 112 |
| Solar reflectance | ASTM C1549-09 | 88.8% |
| Thermal emittance | ASTM C1371-04a | 0.86 |

The solar reflectance is the fraction of the incident solar radiation that is reflected by an irradiated surface; it can vary from zero for a totally absorbent surface, to 1 (i.e. 100%), for a perfectly reflecting surface. The thermal emissivity is the ratio between the thermal radiation actually emitted by a surface and the maximum theoretical emission at the same temperature; this also varies from 0 to 1. A cover surface with high solar reflectance absorbs only a small part of the incident solar radiation. In addition, most of the solar energy that was absorbed is returned to the outside environment if the cover surface has equally high thermal emissivity.

The obtained product can thus be labelled "Energy Star", ensuring a solar reflectance greater than 65%, placing itself as one of the best products currently on the market.

The invention claimed is:
1. Cement-based photocatalytic composition, which comprises:
   (a) from 15 to 60% by weight of at least one cement binder;
   (b) from 0.5 to 12% by weight of at least one photocatalyst;
   (c) from 0.02 to 3% by weight of at least one cellulose ether;
   (d) from 0.05 to 5% by weight of at least one fluidizing agent;
   (e) from 10 to 50% by weight of at least one first calcareous filler in the form of particles of which at least 95% by weight has a dimension not greater than 100 μm;
   (f) from 10 to 50% by weight of at least one second calcareous filler in the form of particles of which at least 95% by weight has a dimension not greater than 30 μm;
   (g) from 0.05 to 5% by weight of at least one silane supported on an inorganic support in the form of powder.
2. Photocatalytic composition according to claim 1, which comprises:
   (a) from 20 to 50% by weight of the at least one cement binder;

(b) from 1 to 8% by weight of the at least one photocatalyst;
(c) from 0.05 to 1.5% by weight of the at least one cellulose ether;
(d) from 0.1 to 2% by weight of the at least one fluidizing agent;
(e) from 15 to 35% by weight of the at least one first calcareous filler in the form of particles of which at least 95% by weight has a dimension not greater than 100 μm;
(f) from 15 to 35% by weight of the at least one second calcareous filler in the form of particles of which at least 95% by weight has a dimension not greater than 30 μm;
(g) from 0.05 to 3% by weight of the at least one silane supported on an inorganic support in the form of powder.

3. Photocatalytic composition according to claim 1, wherein the cement binder (a) is a Portland cement.

4. Photocatalytic composition according to claim 1, wherein the photocatalyst (b) includes photocatalytic titanium dioxide, in anatase crystalline form.

5. Photocatalytic composition according to claim 4, wherein the photocatalytic titanium dioxide has a granulometry such that at least 95% by weight has a dimension not higher than 50 nm.

6. Photocatalytic composition according to claim 4, wherein the photocatalytic titanium dioxide is in admixture with a non-photocatalytic titanium dioxide.

7. Photocatalytic composition according to claim 4, wherein the photocatalytic titanium dioxide has a granulometry such that at least 95% by weight has a dimension not higher than 20 nm.

8. Photocatalytic composition according to claim 1, wherein the cellulose ether (c) has a Brookfield viscosity RVT at 20° C. from 100 to 70,000 mPa·s.

9. Photocatalytic composition according to claim 1, wherein the first calcareous filler (e) is in the form of particles of which at least 95% by weight has a dimension not greater than 70 μm, while the second calcareous filler (f) is in the form of particles of which at least 95% by weight has a dimension not greater than 20 μm.

10. Photocatalytic composition according to claim 1, wherein the first calcareous filler (e) is in the form of particles of which not more than 5% by weight has a dimension not greater than 30 μm.

11. Photocatalytic composition according to claim 1, wherein the calcareous fillers (e) and (f) are present in a weight ratio (e)/(f) from 0.2 to 2.0.

12. Photocatalytic composition according to claim 1, wherein the supported silane (g) is in the form of particles of which at least 95% by weight has a dimension not greater than 100 μm.

13. Photocatalytic composition according to claim 1, further comprising: (h) at least one hydrophobized vinyl polymer.

14. Photocatalytic composition according to claim 13, wherein the (h) at least one hydrophobized vinyl polymer, is a terpolymer of vinylchloride, ethylene and a vinyl ester $CH_2=CH-O-C(=O)-R$, wherein R is an alkyl, linear or branched, $C_4$-$C_{24}$.

15. Photocatalytic composition according to claim 13, wherein the (h) at least one hydrophobized vinyl polymer is from 1 to 20% by weight.

16. Photocatalytic composition according to claim 13, wherein the (h) at least one hydrophobized vinyl polymer is from 3 to 10% by weight.

17. Photocatalytic composition according to claim 1, further comprising: (i) at least one salt of a chain-containing carboxylic acid.

18. Photocatalytic composition according to claim 1, wherein the cellulose ether (c) has a Brookfield viscosity RVT at 20° C. from 100 to 30,000 mPa·s.

19. Photocatalytic composition according to claim 1, wherein the cellulose ether (c) has a Brookfield viscosity RVT at 20° C. from 200 to 10,000 mPa·s.

20. Photocatalytic composition according to claim 1, wherein the first calcareous filler (e) is in the form of particles of which not more than 5% by weight has a dimension not greater than 20 μm.

21. Photocatalytic composition according to claim 1, wherein the calcareous fillers (e) and (f) are present in a weight ratio (e)/(f) from 0.5 to 1.5.

22. Photocatalytic composition according to claim 1, wherein the supported silane (g) is in the form of particles of which at least 95% by weight has a dimension not greater than 80 μm.

23. Method of manufacturing a water-based paint, the method including the steps of adding water to a photocatalytic composition comprising:
(a) from 15 to 60% by weight of at least one cement binder;
(b) from 0.5 to 12% by weight of at least one photocatalyst;
(c) from 0.02 to 3% by weight of at least one cellulose ether;
(d) from 0.05 to 5% by weight of at least one fluidizing agent;
(e) from 10 to 50% by weight of at least one first calcareous filler in the form of particles of which at least 95% by weight has a dimension not greater than 100 μm;
from 10 to 50% by weight of at least one second calcareous filler in the form of particles of which at least 95% by weight has a dimension not greater than 30 μm;
(g) from 0.05 to 5% by weight of at least one silane supported on an inorganic support in the form of powder;
wherein the water/binder weight ratio is in the range from 0.2 to 0.8; and mixing until a fluid and homogeneous product is obtained.

24. Method of manufacturing a water-based paint, the method including the steps of adding water to a photocatalytic composition comprising:
(a) from 20 to 50% by weight of at least one cement binder;
(b) from 1 to 8% by weight of at least one photocatalyst;
(c) from 0.05 to 1.5% by weight of at least one cellulose ether;
(d) from 0.1 to 2% by weight of at least one fluidizing agent;
(e) from 15 to 35% by weight of at least one first calcareous filler in the form of particles of which at least 95% by weight has a dimension not greater than 100 μm;
(f) from 15 to 35% by weight of at least one second calcareous filler in the form of particles of which at least 95% by weight has a dimension not greater than 30 μm;
(g) from 0.05 to 3% by weight of at least one silane supported on an inorganic support in the form of powder;

wherein the water/binder weight ratio is in the range from 0.2 to 0.8; and mixing until a fluid and homogeneous product is obtained.

\* \* \* \* \*